(No Model.) 2 Sheets—Sheet 1.
W. J. McDERMOTT.
VEHICLE SHAFTS.
No. 376,751. Patented Jan. 24, 1888.
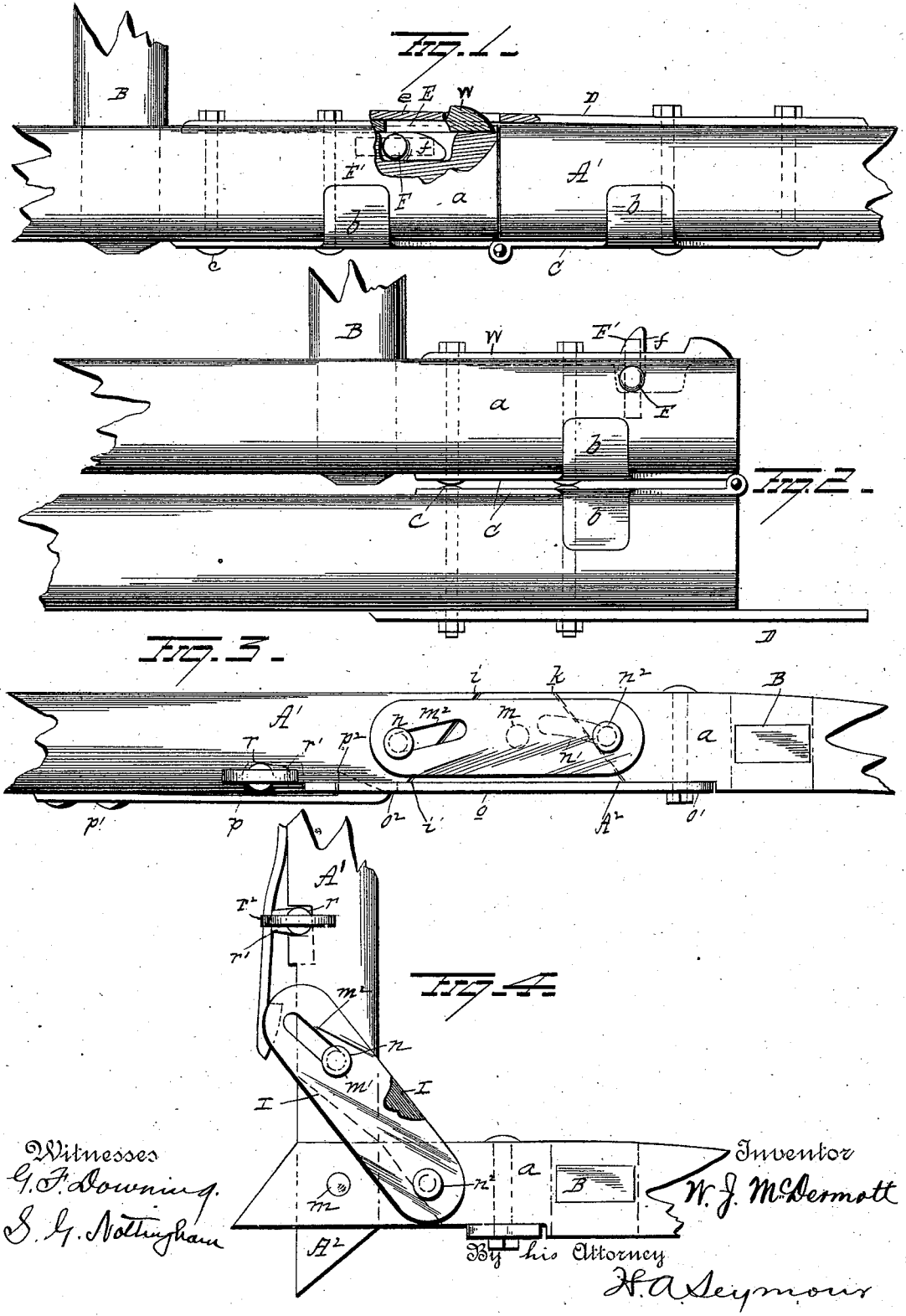
Witnesses
G. F. Downing.
S. G. Nottingham.
Inventor
W. J. McDermott
By his Attorney
H. A. Seymour

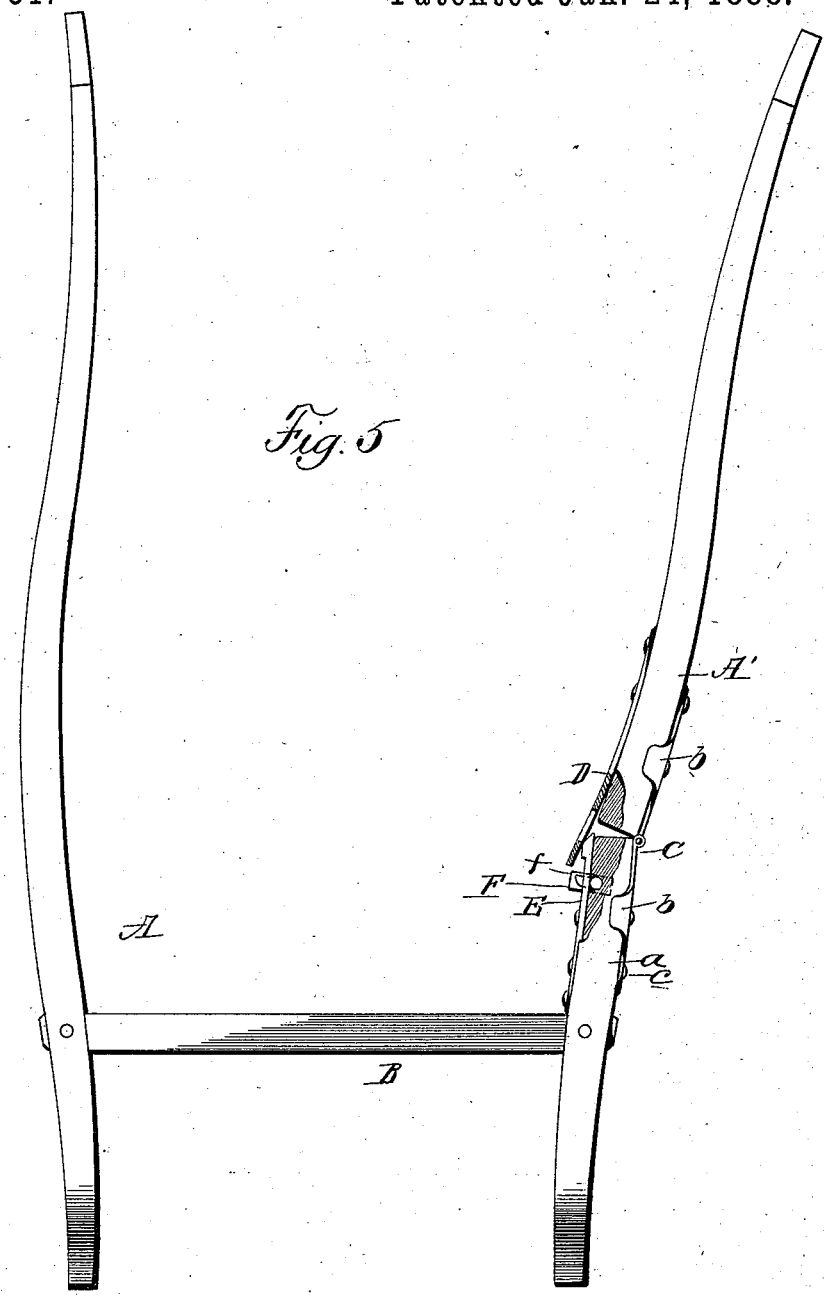

UNITED STATES PATENT OFFICE.

WILLIAM J. McDERMOTT, OF GRUBBVILLE, MISSOURI.

VEHICLE-SHAFTS.

SPECIFICATION forming part of Letters Patent No. 376,751, dated January 24, 1888.

Application filed May 26, 1887. Serial No. 239,451. (No model.)

*To all whom it may concern:*

Be it known that I, WILLIAM J. MCDERMOTT, of Grubbville, in the county of Franklin and State of Missouri, have invented certain new and useful Improvements in Shafts or Thills for Vehicles; and I do hereby declare the following to be a full, clear, and exact description of the invention, such as will enable others skilled in the art to which it appertains to make and use the same.

My invention relates to an improvement in jointed or hinged shafts for vehicles, the object being to provide a device of this character that will permit the safe and easy attachment of spirited horses to vehicles, dispensing with the necessity of backing a horse into the thills or shafts, as is common when draft-animals are being attached to the ordinary shafts of a carriage or other vehicle.

With this object in view my invention consists in certain features of construction and combinations of parts, that will be hereinafter described, and pointed out in the claims.

Referring to the drawings making a part of this specification, Figure 1 is a view of a section of a shaft embodying my invention. Fig. 2 is a view of same in position to receive the horse or other animal. Fig. 3 is a modified form of the improved shafts for vehicles or farm implements, to which the invention is also applicable. Fig. 4 is a view of the modified form of my improved shafts, with one shaft unlocked and elevated to permit the attachment of a horse thereto; and Fig. 5 is a view of the complete shafts.

In the preferred form, A A' represent a pair of shafts of a carriage, buggy, or other vehicle; or the shafts may be made proportionately heavy to serve for the draft of a wagon or farming implement or machine. Near the cross-bar B, that connects the shafts A A', the shaft A' is cut into two pieces, the stub $a$ of this shaft being in rigid connection with the cross-bar B. A strap-hinge, C, is secured to the outer surface of the shaft A' and stub $a$ of the same to afford a hinged connection of these parts, and thus permit the free end of the shaft to be made to swing away from its mating shaft and assume a position parallel to the stub $a$, as is shown in Fig. 2.

The strap-hinge C is preferably made with integral lugs $b\ b$, which are made to embrace the top and bottom surfaces of the shaft A' and stub $a$, to properly secure the hinge from displacement and relieve the attaching screws $c$ $c$, &c., from any strain.

Upon the inner surface of the shaft A' a plate-spring, D, of requisite tensional strength, is affixed in any stable manner at or near one end, the opposite or free end being provided near its extremity with a hole of proper size to admit the insertion through it of the latch-hook E, which is also affixed to register with the hole made for it in spring D, and have its hooked edge engage with and retain this spring when the shaft A' is extended in its normal position, as shown in Fig. 1.

Through the body of the latch-hook W a hole, E, is cut to permit the cam-lug $f$, formed on the side of the bolt F, to project through this hole $e$ and engage with its outer end the adjacent surface of the spring D.

The body of the bolt F is held in place in the groove $g$, made for its reception in the stub $a$, by the bearing contact of the latch-hook E upon its cylindrical body, and the projection of the cam-lug $f$, through the hole in latch-hook W, prevents the bolt F from vertical displacement. The upper projecting end of the bolt F is enlarged to form a thumb-piece, F', by which it is partially rotated.

When the shaft A' is extended to mate with its fellow shaft A, the latch-hook E will be in close hooked contact with the plate-spring D, and will thus retain the two pieces A' $a$ of the shaft in secured position.

If it is desired to attach a horse to the vehicle on which the shafts are placed, the bolt F is turned to cause its cam to bear upon the spring D and release its engagement with the latch-hook E. The free outer portion of the shaft A' may now be made to swing as a gate laterally on its hinge C and fold rearwardly. The animal that is to be connected with the vehicle is made to take a position in line with the attached shaft A, and, if necessary, the horse may be gently forced to move sidewise to assume a near proximity to this fixed shaft A. The swinging shaft A' may now be moved forwardly on its hinge C and the harness made fast to the shafts A A', when the hitching operation is complete without harassing the animal, as is often the result of an attempt to back a spirited horse into a pair of shafts in the ordinary manner.

It is apparent that the shaft A' may be so connected to the cross-bar B that the hinge C will rest on the top surface of this shaft, instead of the outside, and in this case the free hinged portion of the shaft may be raised upright, in place of swinging outwardly, as has been previously described.

In the modified form shown in Figs. 3 and 4 of the drawings the manner of hinging the free end of the shaft A' to the stub $a$ is somewhat different in mechanical features, which will now be described. The shaft A' (see Figs. 3 and 4) is provided with a tongue, A$^2$, which is a projecting rear end of this shaft. The shoulders $i$ of this tongue are cut diagonal to the top and under surfaces of the shaft, while the free end of the tongue is sloped in an opposite direction, or toward these inclined shoulders at the top side of the shaft A'. The stub $a$ is slotted at $k$ to receive the tongue A$^2$, and the rear portion or termination of this slot is given a slope to correspond with the incline of the outer end of the tongue A$^2$, the stub $a$ and shaft A' being pivoted to permit an upward movement of this shaft upon the pivot $m$. (See Fig. 4.) Upon each side of the shaft A' and its stub $a$ the links I I' are pivoted. The link I, that is located upon the outside of the shaft, is pivoted near the cross-bar B, and is made to extend forwardly to engage a stud, $m'$, on the shaft A' near the diagonal shoulder of its hinge, a slot, $m^2$, in the link affording a means of such connection. The link that is pivoted at the point $n$ on the inner face of the shaft A' at a point directly opposite the stud $m'$ that engages the link I, and a slot, $n'$, is formed in this link similar to the slot $m^2$ in link I. The slot $n'$ is engaged by the stud $n^2$, which is rigidly fixed in the stub $a$ of the shaft.

The construction and combination of parts just described will permit a free upward movement of the shaft A' on its pivot $m$, and the links I I' afford a support laterally for the shaft at its point of connection with the stub $a$.

Immediately below the hinged joint formed on the shaft A' a swinging latch, $o$, is pivoted at its rear end, $o'$. To the under side of the stub $a$, close to the cross-bar B, near the forward end of this latch $o$, a latch-hole, $o^2$, is made through the latch to engage a spring-plate hook, $p$, that is secured at its forward end, $p'$, to the shaft A', and on its free rear end a projecting shoulder, $p^2$, is made, to enter the hole $o^2$ in the swinging latch $o$ when this latch is placed in line with the shaft A'. The shoulder $p^2$ is made with a slope or incline on its side to permit the ready engagement of the latch $o$ automatically by the simple swinging of the latch to its place below and in a line with the shaft and its stub, to rigidly connect these parts together. A cam-bolt, $r$, is located below the shaft and is boxed in a groove in the lower surface of this shaft A', to retain it in place and permit its partial rotation to depress the spring hook $p$ sufficiently by the contact of its cam-toe $r'$ with the surface of this hook a thumb-piece, $r^2$, formed on the outer end of the bolt $r$ affording a convenient means of operating the bolt.

When this modified form of hinged shaft is to be used to facilitate the connection of a spirited horse to a vehicle, the hinged shaft A' is released, as has just been described, and the free end A' elevated, as shown in Fig. 4. The horse may now be placed in line with the fixed shaft without difficulty, no backing or other harassing movement being necessary, so that worriment of the animal is avoided. The elevated shaft A' may be made to line with the fixed shaft A by simply lowering it. The latch $o$ is made to engage the spring-hook $p$ by swinging it so as to cause it to lock with this hook automatically.

It is apparent that the device hereinbefore described, as well as the modified form of construction shown, will afford a safe and convenient means of attaching spirited or fractious horses to vehicles that cannot be so connected in the ordinary way. As horses of a nervous or irritable nature will become excited and in some cases "balky" when any attempt is made to force them into a lining position between a pair of ordinary shafts, the advantages of my improved construction of shafts or thills for vehicles, wagons, or machines that have shafts is self-evident.

Many slight changes might be made in the constructive features of my improved hinged shafts without departing from the spirit and scope of my invention; hence I do not desire to restrict myself to the exact forms shown; but, Having fully described my invention, what I claim as new, and desire to secure by Letters Patent, is—

1. In hinged shafts for vehicles, the combination, with a short stub end of a shaft and a cross-bar to connect the stub end to a fixed shaft, of a hinged shaft and a means of securing this shaft to line with the fixed shaft and thus become a rigid continuation of the stub, substantially as set forth.

2. In hinged shafts, the combination of a divided shaft the stub end of which is fixed to the cross-bar, the free portion of this divided shaft being hinged to the stub, and a spring-latch that automatically engages its hook to hold the stub and shaft rigidly together when the free end of the divided shaft is made to swing in line with its stub, substantially as set forth.

3. In hinged shafts, the combination, with a cross-bar and a short stub of a shaft, of a free shaft, a hinge to connect this free shaft to its stub, a spring latch-hook, a plate-spring, and a cam-bolt to disengage the plate-spring from the latch-hook, substantially as set forth.

4. In hinged shafts, the combination, with a short stub of a shaft and a cross-bar connecting said stub to an integral shaft, of a free shaft, a hinge to connect this free shaft to its stub, a plate-spring having a hole in its free end, a spring latch-hook to enter the hole in the plate-spring, and a cam-bolt the cam-lug of which passes through the latch-hook to bear on the plate-spring and lift it when the bolt is turned, substantially as set forth.

5. In hinged shafts, the combination, with a cross-bar and a short stub of a shaft that is slotted, of a free shaft having a tongue to mate the slotted end of the stub, two links pivoted on the sides of the shaft and stub, a swinging pivoted latch, a spring-hook, and a cam-bolt to release this spring-hook, substantially as set forth.

In testimony whereof I have signed this specification in the presence of two subscribing witnesses.

WILLIAM J. McDERMOTT.

Witnesses:
R. B. DENNY, Jr.,
JAMES P. KEE.